(12) United States Patent
Kawagoe

(10) Patent No.: US 11,042,154 B2
(45) Date of Patent: Jun. 22, 2021

(54) TRANSPORTATION EQUIPMENT AND TRAVELING CONTROL METHOD THEREFOR

(71) Applicant: HONDA MOTOR CO., LTD., Tokyo (JP)

(72) Inventor: Hiroyuki Kawagoe, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 148 days.

(21) Appl. No.: 16/299,610

(22) Filed: Mar. 12, 2019

(65) Prior Publication Data
US 2019/0286125 A1   Sep. 19, 2019

(30) Foreign Application Priority Data

Mar. 15, 2018   (JP) .............................. JP2018-048525

(51) Int. Cl.
*G05D 1/00* (2006.01)
*G02B 27/01* (2006.01)
*B60K 35/00* (2006.01)
*G05D 1/02* (2020.01)

(52) U.S. Cl.
CPC ........... *G05D 1/0055* (2013.01); *B60K 35/00* (2013.01); *G02B 27/0101* (2013.01); *G05D 1/0223* (2013.01); *B60K 2370/155* (2019.05); *B60K 2370/184* (2019.05); *B60K 2370/1868* (2019.05); *B60K 2370/334* (2019.05); *B60K 2370/52* (2019.05); *G02B 2027/0141* (2013.01)

(58) Field of Classification Search
CPC .... G05D 1/0055; G05D 1/0223; B60K 35/00; B60K 2370/52; B60K 2370/155; B60K 2370/184; B60K 2370/334; B60K 2370/1868; B60K 2370/149; B60K 2370/175; B60K 2370/194; G02B 27/0101; G02B 2027/0141; B60W 50/14; B60W 40/08; B60W 2050/146
See application file for complete search history.

(56) References Cited

U.S. PATENT DOCUMENTS

2016/0003636 A1* 1/2016 Ng-Thow-Hing ..... G08G 1/167
701/26

FOREIGN PATENT DOCUMENTS

JP        2015-141536 A    8/2015

* cited by examiner

*Primary Examiner* — Thomas G Black
*Assistant Examiner* — Ana D Thomas
(74) *Attorney, Agent, or Firm* — Rankin, Hill & Clark LLP

(57) ABSTRACT

Transportation equipment includes a controller configured to perform at least steering, acceleration and deceleration to control traveling of the transportation equipment, a sight line detector for detecting a sight line of an occupant of the transportation equipment, and a display configured to display a sight line guidance pattern used to guide the sight line of the occupant. The controller causes the display to display the sight line guidance pattern while the transportation equipment is traveling, determines whether the sight line of the occupant detected by the sight line detector moves to a vicinity of a position at which the sight line guidance pattern is displayed, and continues or stops the traveling of the transportation equipment based on a result of the determination.

20 Claims, 6 Drawing Sheets

TRANSPORTATION EQUIPMENT AND TRAVELING CONTROL METHOD THEREFOR

CROSS-REFERENCE TO RELATED APPLICATION

This application is based upon and claims priority from the Japanese Patent Application No. 2018-048525, filed on Mar. 15, 2018, the entire contents of which are incorporated herein by reference.

BACKGROUND OF THE INVENTION

1. Field of the Invention

The present invention relates to transportation equipment which a driver occupies and drives when necessary, and a traveling control method for the transportation equipment.

2. Description of the Related Art

In recent years, efforts have been underway toward practical use of an automatic traveling vehicle capable of traveling on a general road without requiring a driver to occupy the vehicle. On the other hand, it is not too much to say that an automatic traveling vehicle whose automatic driving is assisted by a driver occupying the vehicle has almost reached a practical use level. However, there is a case where such an automatic traveling vehicle raises the necessity that the driver takes responsibility for monitoring the automatic driving conditions. In this case, the driver is required to be ready to secure safe driving at all times.

Incidentally, the definition of levels of automatic traveling is almost understood in this industry, as follows. Level 1 is defined as automatic execution of any one of acceleration and deceleration, steering, and braking. Level 2 is defined as automatic execution of two or more of acceleration and deceleration, steering, and braking on condition that the driver takes the monitoring responsibility. Level 3 is defined as automatic execution of all of acceleration and deceleration, steering, and braking on condition that the driver deals with emergency situation. Level 4 is defined as complete automatic execution of all of acceleration and deceleration, steering, and braking.

Level 2 and Level 3 require the driver to occupy the vehicle. Level 2 requires the driver to monitor the condition of the automatic driving (to take the monitoring responsibility). Level 3 involves the monitoring responsibility when the system demands. For these reasons, the automatic traveling at Level 2 and Level 3 is sometimes referred to as a "semi-automatic traveling." Incidentally, Level 1 is not included in the category of the automatic traveling.

As described above, if the driver of the automatic traveling vehicle is required to take the monitoring responsibility, the driver needs to be aware enough to fulfill the monitoring responsibility even while the automatic traveling is performed. Since the automatic traveling reduces the number of manipulations to be performed by the driver, the driver is easy to fall into an unaware condition such as a dozing condition. The unaware condition makes it difficult for the driver to fulfill the monitoring responsibility.

Various conventional methods have been proposed for or performed by general vehicles other than the automatic traveling vehicles for the purpose of keeping drivers aware by giving the drivers stimuli such as vibration, cool wind, smell, sound and light. However, it is not necessarily confirmed whether these methods succeed in making the drivers aware enough to fulfill the monitoring responsibility while the automatic driving is performed.

Japanese Unexamined Patent Application Publication No. 2015-141536 (Patent document 1) discloses an example of a system which does things such as displaying multiple moving objects on a screen of a drive simulator, and acquires a driver's (subject's) recognition reaction, prediction reaction, discrimination reaction and so on to the displayed moving objects to evaluate the driver's agility. This system is capable of appropriately determining whether the driver (subject) can fulfill the monitoring responsibility while the automatic driving is being performed.

The system for evaluating the driver's agility disclosed in Patent document 1, however, is not intended to evaluate the driver's recognition reaction or agility while the driver is driving the vehicle. Accordingly, whether the driver of the automatic traveling vehicle is aware cannot be checked using this system. That is, the system disclosed in Patent document 1 is not applicable to the automatic traveling vehicle, and thus sufficient reliability of the automatic driving cannot be secured with this system.

The present invention has been made to solve the above problems and an object of the invention is to provide transportation equipment (automatic traveling vehicle) that determines whether a driver can fulfill responsibility for monitoring the automatic traveling and determines whether to continue the automatic traveling based on a result of the determination, and to provide a traveling control method for the transportation equipment.

SUMMARY OF THE INVENTION

In order to attain the above object, according to an aspect of the present invention, transportation equipment reflecting one aspect of the present invention includes: a controller configured to perform at least steering, acceleration and deceleration to control traveling of the transportation equipment; a sight line detector for detecting a sight line of an occupant of the transportation equipment; and a display configured to display a sight line guidance pattern used to guide the sight line of the occupant, wherein the controller is configured to cause the display to display the sight line guidance pattern while the transportation equipment is traveling, determine whether the sight line of the occupant detected by the sight line detector moves to a vicinity of a position at which the sight line guidance pattern is displayed, and continue or stop the traveling of the transportation equipment based on a result of the determination.

BRIEF DESCRIPTION OF THE DRAWINGS

The features and advantages provided by one or more embodiments of the invention will become apparent from the detailed description given below and appended drawings which are given only by way of illustration, and thus are not intended as a definition of the limits of the present invention.

DETAILED DESCRIPTION OF THE EMBODIMENTS

Hereinafter, one or more embodiments of the present invention will be described in detail with reference to the drawings. Note that in the description below, the same constituent element is given the same reference sign and thus duplicate explanation thereof is omitted.

Figure 1:
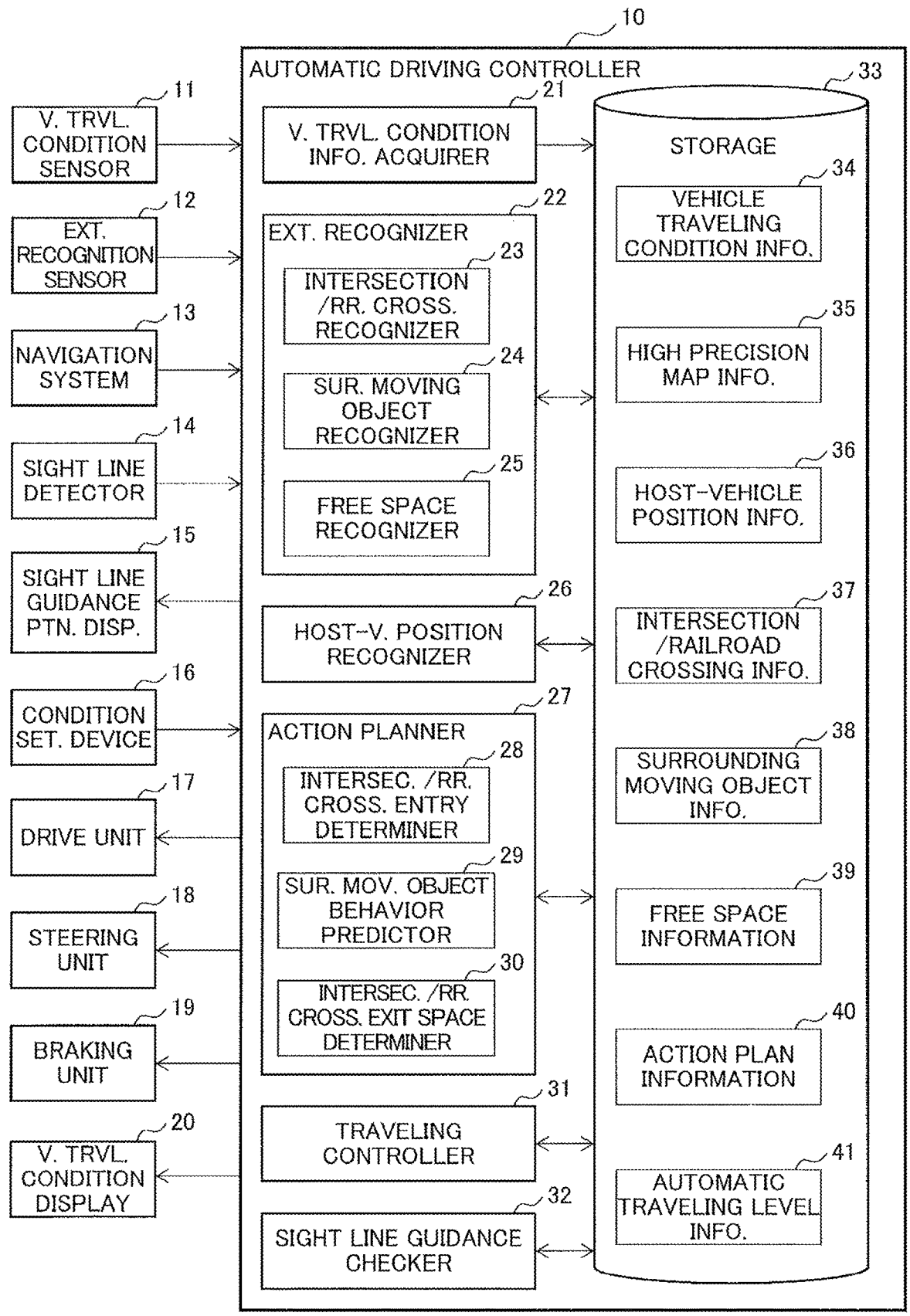
FIG. 1 is a diagram showing an example of configuration of an automatic driving controller installed in an automatic traveling vehicle according to an embodiment of the present invention, and various devices and units connected to the automatic driving controller.

FIG. 1 is a diagram showing an example of configuration of an automatic driving controller 10 installed in an automatic traveling vehicle according to an embodiment of the present invention, and various devices and units connected to the automatic driving controller 10. Examples of the automatic traveling vehicle include an automobile, a bus, a truck, and a two-wheeled motorbike, but are not necessarily limited to these vehicles.

As shown in FIG. 1, the automatic driving controller 10 includes a vehicle traveling condition sensor 11, an external recognition sensor 12, a navigation system 13, a sight line detector 14, a sight line guidance pattern display 15, a condition setting device 16, a drive unit 17, a steering unit 18, a braking unit 19, a vehicle traveling condition display 20. The automatic driving controller 10 further includes a vehicle traveling condition information acquirer 21, an external recognizer 22, a host-vehicle position recognizer 26, an action planner 27, a traveling controller 31, a sight line guidance checker 32 and a storage 33. Incidentally, the automatic driving controller 10 is implemented by one or more computers each including an arithmetic processor and a storage unit.

The vehicle traveling condition sensor 11 includes a vehicle speed sensor, an acceleration sensor, a direction sensor and a yaw rate sensor. Information about the vehicle speed, acceleration, traveling direction and yaw rate of the host vehicle detected by the vehicle traveling condition sensor 11 is input by the vehicle traveling condition information acquirer 21 into the automatic driving controller 10, and is stored on the storage 33 as vehicle traveling condition information 34. Meanwhile, things, such as the vehicle speed acquired by the vehicle speed sensor in the vehicle traveling condition sensor 11 and mileage obtained by integrating the vehicle speed, are shown on vehicle traveling condition display 20 (a speedometer, an odometer and the like).

The external recognition sensor 12 includes an optical camera, a millimeter wave radar, and a laser imaging detection and ranging (LIDAR) system. Based on information acquired by the external recognition sensor 12, the external recognizer 22 in the automatic driving controller 10 detects the width of a road which the host vehicle is traveling and a lane which the host vehicle is traveling, as well as detects the position of a vehicle traveling around the host vehicle, and the relative speed of the vehicle to the host vehicle. The external recognizer 22 further detects a traffic sign, a bicycle and a pedestrian.

The navigation system 13 receives radio waves from Global Positioning System (GPS) satellites and quasi-zenith satellites via a Global Navigation Satellite System (GNSS) receiver, and thereby acquires host-vehicle position information. Inertial navigation techniques using the information detected by the direction sensor, the vehicle speed sensor, the acceleration sensor and the like are often used to acquire accurate host-vehicle position information, and to acquire information about the host-vehicle position in a tunnel where the navigation system 13 cannot receive radio waves from GPS satellites and quasi-zenith satellites.

The navigation system 13 includes map information (so-called navigation map), and acquires information about a path from the host-vehicle position to a destination based on destination information input by the driver. The acquired path information is shown on a display or the like annexed to the navigation system 13. When the host-vehicle position is approaching an intersection (including a junction and a fork in a highway) or a railroad crossing, the navigation system 13 issues a notice with sound of the approach in advance, and shows the shape of a road in the intersection or the railroad crossing.

The host-vehicle position recognizer 26 in the automatic driving controller 10 stores the host-vehicle position information, the path information, and the forecast information about the approach to the intersection, the railroad crossing or the like, which are acquired by the navigation system 13, on the storage 33 as host-vehicle position information 36 and intersection/railroad crossing information 37. Meanwhile, based on lane information acquired using the external recognition sensor 12 such as the optical camera, the host-vehicle position recognizer 26 identifies the lane which the host vehicle is traveling. For example, in a case where the host vehicle is traveling a lane on a road with two lanes on each in each side, the host-vehicle position recognizer 26 identifies things such as whether the host vehicle is traveling the right or left lane on the side.

The external recognizer 22 in the automatic driving controller 10 includes an intersection/railroad crossing recognizer 23, a surrounding moving object recognizer 24, and a free space recognizer 25.

Based on the information about the approach to the intersection, the railroad crossing or the like which is received from the navigation system 13, the intersection/railroad crossing recognizer 23 refers to high-precision map information 35 stored on the storage 33, and acquires a detailed shape of the intersection or the railroad crossing (such as the number of lanes on each of the roads which meet or cross, and the shape of each crossing road). The intersection/railroad crossing recognizer 23 further recognizes things such as whether traffic signals are installed in the intersection, the railroad crossing or the like are.

In this event, the surrounding moving object recognizer 24 identifies the host-vehicle position in the lane where the host vehicle is traveling, acquired from the high-precision map information 35, and further acquires things such as the position of another vehicle traveling around the host vehicle, the lane where the vehicle is traveling, as well as the relative speed and acceleration of the vehicle to the host vehicle. Furthermore, the surrounding moving object recognizer 24 recognizes a pedestrian walking around the host vehicle, on crosswalks in the intersection, or the like, and acquires the walking direction and speed of the pedestrian. Information about the acquired things such as the position and lane of the other vehicle, and the relative speed and acceleration of the other vehicle to the host vehicle, as well as information about the acquired things such as the position, walking direction and walking speed of the pedestrian, are stored on the storage 33 as surrounding moving object information 38.

The free space recognizer 25 detects free spaces around the host vehicle, that is to say, road areas where there is no vehicle or no pedestrian. Information about the detected free spaces is store on the storage 33 as free space information 39.

The action planner 27 in the automatic driving controller 10 includes an intersection/railroad crossing entry determination 28, a surrounding moving object behavior predictor 29 and an intersection/railroad crossing exit space determination 30.

Based on things such as the path information and the host-vehicle position information 36 which are acquired by the navigation system 13, the intersection/railroad crossing entry determination 28 determines which lane the host vehicle should enter (the entry lane). In this event, for example, in a case where the host vehicle is going to make a right turn in the intersection, the lane which the host vehicle should enter is determined as being the right lane. Thereafter, the intersection/railroad crossing entry determination 28 determines whether the host vehicle has entered an entry area to the intersection or the railroad crossing.

The surrounding moving object behavior predictor 29 predicts the behaviors of the other vehicle and the pedestrian existing around the host vehicle. For the purpose of predicting the behavior of the other vehicle, the surrounding moving object behavior predictor 29 uses the host-vehicle position information, and the information about the relative speed and acceleration of the other vehicle to the host vehicle, and the like which are recognized by the surrounding moving object recognizer 24. Furthermore, for the purpose of predicting the behavior of the other vehicle while the host vehicle is in the intersection or the like, the surrounding moving object behavior predictor 29 uses information about the flashing of the turn signal lamp of the other vehicle in front of the host vehicle, and the like. Moreover, for the purpose of predicting the behavior of the pedestrian, the surrounding moving object behavior predictor 29 uses the position, walking direction, walking speed and the like of the pedestrian.

The intersection/railroad crossing exit space determination 30 determines whether a free space which allows the host vehicle to enter it is left in a lane (exit lane) in a road providing an exit from the intersection or the railroad crossing. As part of the free space information 39, information about whether such a free space is left in the exit lane is also stored on the storage 33.

As action plan information 40, the thus-acquired information about the entry lane to and the exit lane from the intersection or the railroad crossing, the thus-acquired information about the straight run, the right turn, the left turn or the like, the thus-acquired information about the presence or absence of the free space in the exit lane, and similar things are stored on the storage 33. The action planner 27 further sets a travel control plan for the host vehicle with taken into consideration the behaviors of the other vehicle and the pedestrian predicted by the surrounding moving object behavior predictor 29. In other words, the action planner 27 sets a detailed travel control plan including, for example, information about and timings of the stop, acceleration and deceleration, and steering of the host vehicle when the host vehicle passes the intersection or the railroad crossing.

Based on the travel control plan thus set, the traveling controller 31 calculates traveling control information to be used to control the drive unit 17, the steering unit 18 and the braking unit 19. The traveling controller 31 then outputs the calculated traveling control information to the drive unit 17, the steering unit 18 and the braking unit 19. Incidentally, when the traveling controller 31 calculates the traveling control information, the information about the positions, moving speeds and the like of the other vehicle and the pedestrian, which is acquired by the surrounding moving object recognizer 24 in real time, is appropriately fed back to the traveling controller 31.

The automatic driving controller 10 having the above configuration makes it possible for the automatic traveling vehicle according to the embodiment to automatically run on general roads. As described above, however, the current situation is that the automatic driving at Levels 2 and 3 requires the driver to ride the automatic traveling vehicle, and to take the responsibility for monitoring the automatic driving, as well as to drive the vehicle depending on the necessity. The automatic traveling vehicle according to the embodiment, therefore, is provided with the steering wheel, the acceleration pedal and the braking pedal, like a conventional vehicle.

The automatic traveling vehicle according to the embodiment further includes the condition setting device 16. This makes it possible for the driver to manually set an automatic driving level using the condition setting device 16 depending on the necessity. As automatic driving level information 41, the set automatic driving level is stored on the storage 33.

The automatic driving level information 41 not only can be set by the driver using the condition setting device 16, but also is automatically set by the automatic driving controller 10 based on the information acquired by the navigation system 13 and the like depending on the necessity. For example, when the host vehicle enters a highway from a general road, the automatic driving level information 41 is automatically switched from Level 2 to Level 3. Conversely, when the host vehicle enters a general road from a highway, the automatic driving level information 41 is automatically switched from Level 3 to Level 2. Furthermore, when the host vehicle enters a general road in a congested urban area from a general road, the automatic driving level information 41 is automatically switched from Level 2 to Level 1. When the host vehicle comes out of the congested urban area, the automatic driving level information 41 is automatically switched from Level 1 to Level 2. Incidentally, cases where the automatic driving level information 41 is automatically set (switched) are not limited to these examples.

The automatic traveling vehicle according to the embodiment is provided with the sight line detector 14 and the sight line guidance pattern display 15 both serving as means for determining whether the driver is aware enough to fulfill the responsibility for monitoring the automatic driving. In addition, the automatic driving controller 10 includes the sight line guidance checker 32. Detailed descriptions will be hereinbelow provided for the sight line detector 14, the sight line guidance pattern display 15 and the sight line guidance checker 32.

Figure 2:
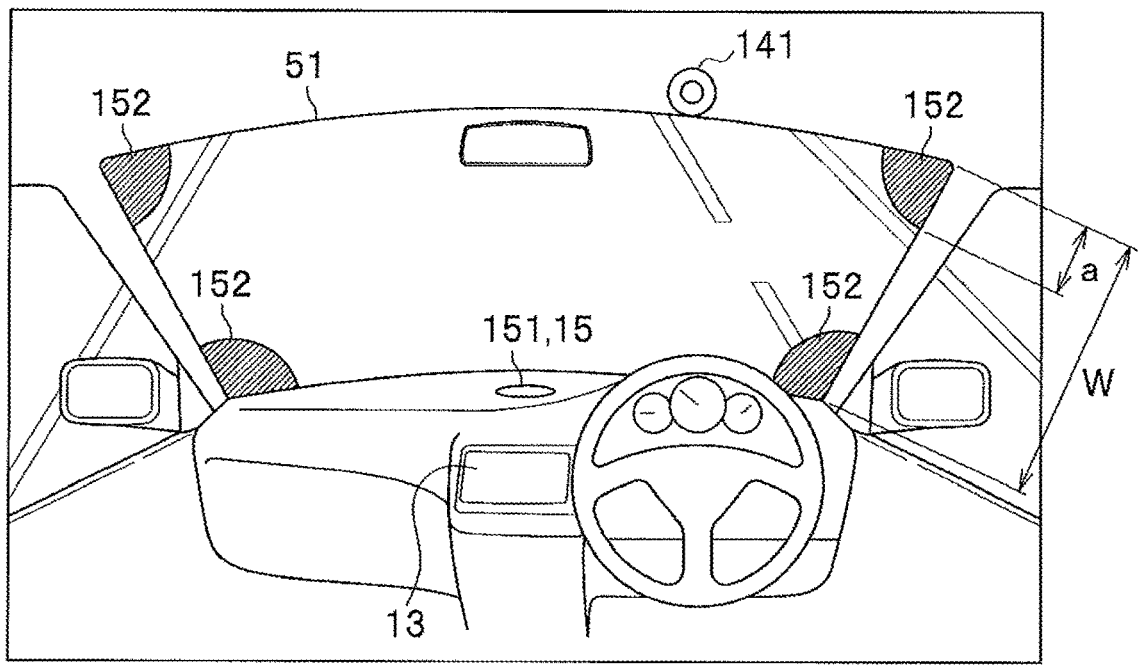
FIG. 2 is a diagram showing an example of a display screen of a sight line guidance pattern display provided in the automatic traveling vehicle according to the embodiment of the present invention.
Figure 3:
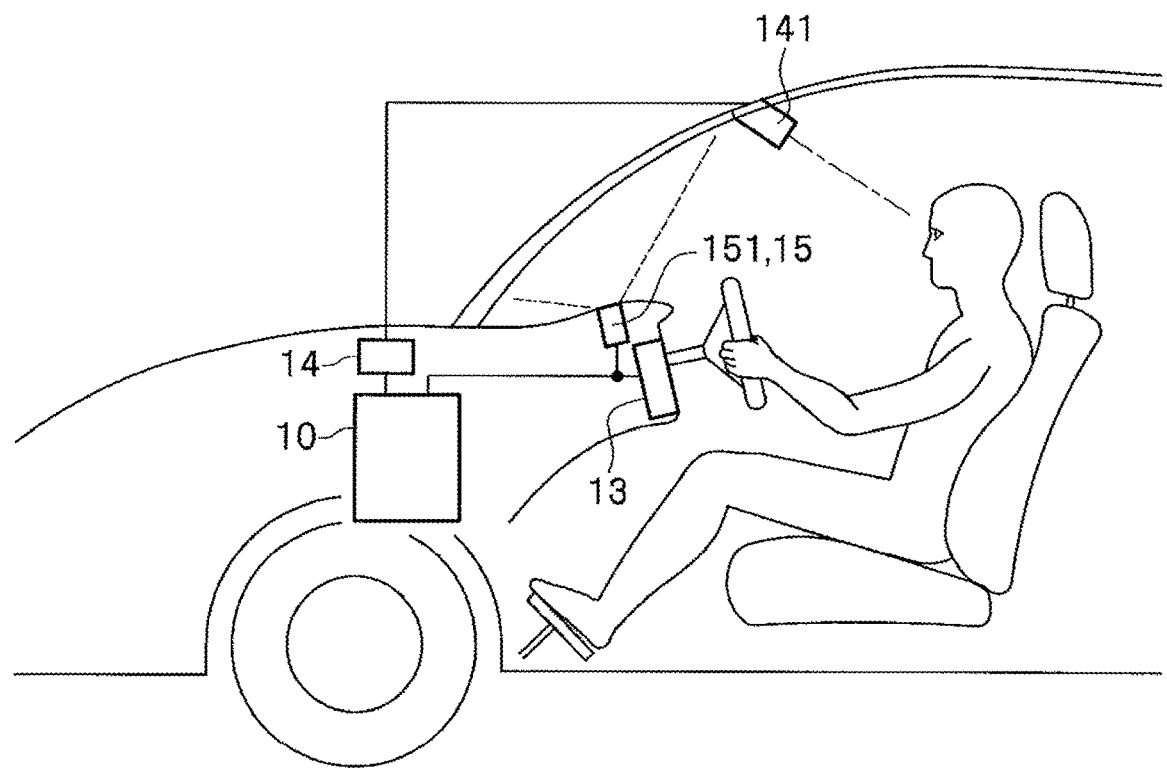
FIG. 3 is a diagram showing an example of positions at which a driver monitor camera and a HUD are placed.

FIG. 2 is a diagram showing an example of a display screen of the sight line guidance pattern display 15 provided to the automatic traveling vehicle according to the embodiment of the present invention. FIG. 3 is a diagram showing an example of positions where to place a driver monitor camera 141 and a head-up display (HUD) 151.

In the embodiment, the HUD 151 is a projection-type display for projecting an image onto a screen, and is used as the sight line guidance pattern display 15. A windshield glass 51 of the vehicle is used as the screen of the HUD 151, that is to say, the sight line guidance pattern display 15. In this case, the HUD 151 is mounted, for example, inside the dashboard such that part of the projection lens thereof juts out above the dashboard.

It should be noted that the HUD 151 like this is usually used, for example, as the display of the navigation system 13 as well. In this case, the path information, the information about the traveling course in the intersection, and the like are displayed on the windshield glass 51 such that these pieces of information are superimposed on a landscape seen through the windshield glass 51. The driver, therefore, can obtain various kinds of information useful for the driving without looking away from the front landscape.

In the embodiment, the sight line guidance pattern display 15 made of the HUD 151 displays sight line guidance patterns 152, respectively, in positions corresponding to the four corners of the windshield glass 51 serving as the screen. In this respect, each sight line guidance pattern 152 is a figure or the like to be displayed in order to guide the driver's sight line. In the example in FIG. 2, each sight line guidance pattern 152 is shown as a fan-shaped figure, but may be a figure shaped like a thing other than a fan. Incidentally, since each sight line guidance pattern 152 is displayed in order to check the guidance of the driver's sight line, it is preferable that the sight line guidance patterns 152 be displayed in an eye-catching color such as a bright red.

Each sight line guidance pattern 152 is displayed only while the guidance of the driver's sight line is being checked. However, it is desirable that the sight line guidance patterns 152 should not narrow the front landscape which the driver sees, since the sight line guidance patterns 152 are displayed on the windshield glass 51. It is therefore preferable that a size a of each sight line guidance pattern 152 be equal to or less than one fifth of a vertical-direction window width W of the windshield glass 51. In short, a≤W/5 is preferable.

As shown in FIGS. 2 and 3, in the embodiment, the driver monitor camera 141 for detecting the sight line is provided above the windshield glass 51. The driver monitor camera 141 is connected to the sight line detector 14. The driver monitor camera 141 captures an image of a part of the driver inclusive of the driver's face, and sends the captured image to the sight line detector 14.

The sight line detector 14 is made of an image processor (whose illustration is omitted) for processing the image captured by the driver monitor camera 141. In other words, the sight line detector 14 detects the driver's sight line from the image including the driver's face captured by the driver monitor camera 141, particularly, the direction of the driver's face and the positions of the pupils in the eyes of the driver which are included in the image. The sight line detector 14 further detects a position at which the detected driver's sight line meets and crosses the windshield glass 51 serving as the screen of the HUD 151, and sends information about the position to the sight line guidance checker 32 in the automatic driving controller 10.

Figure 4:
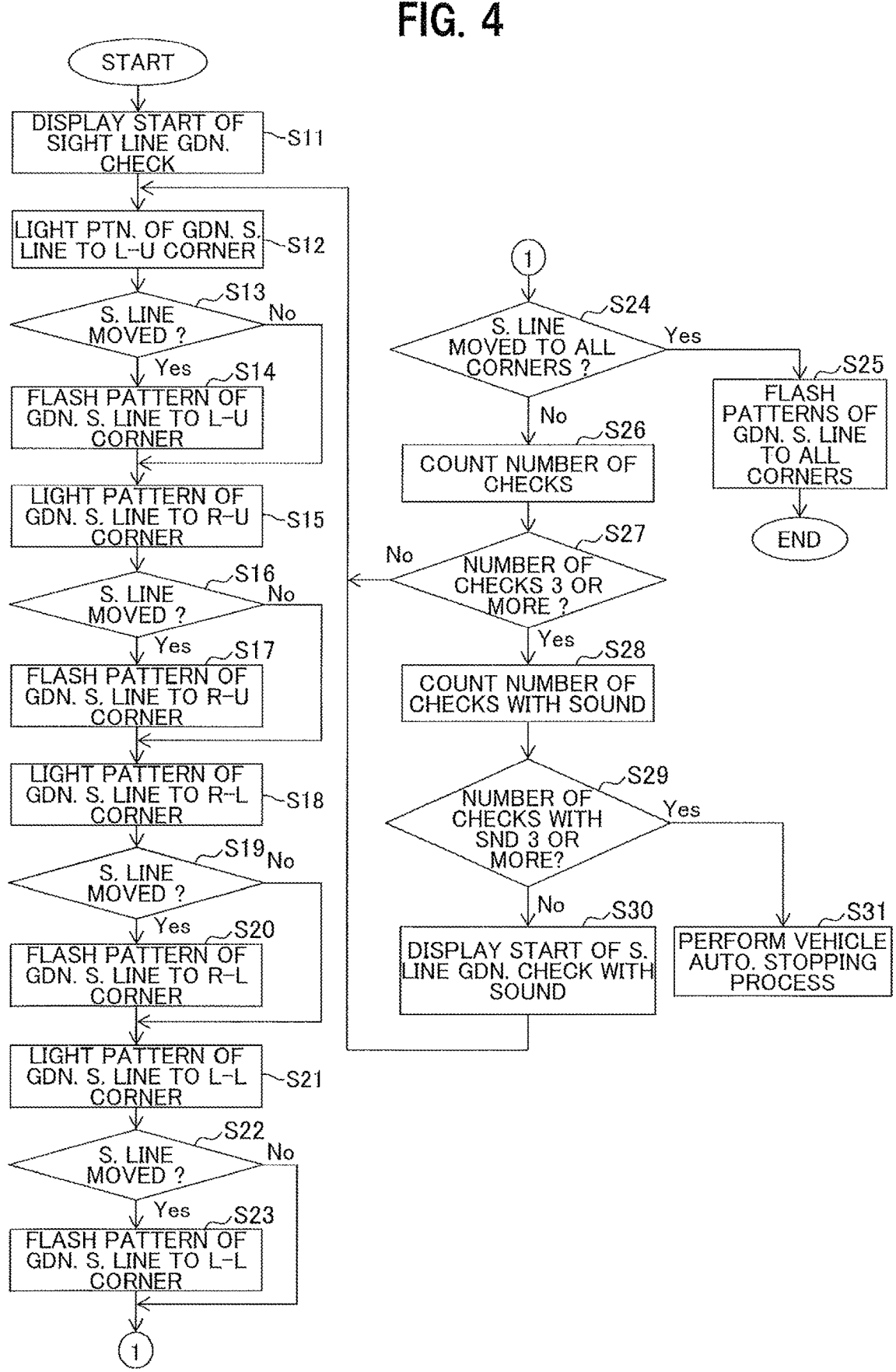
FIG. 4 is a diagram showing an example of a process flow of sight line guidance check process to be performed by a sight line guidance checker.
Figure 5:
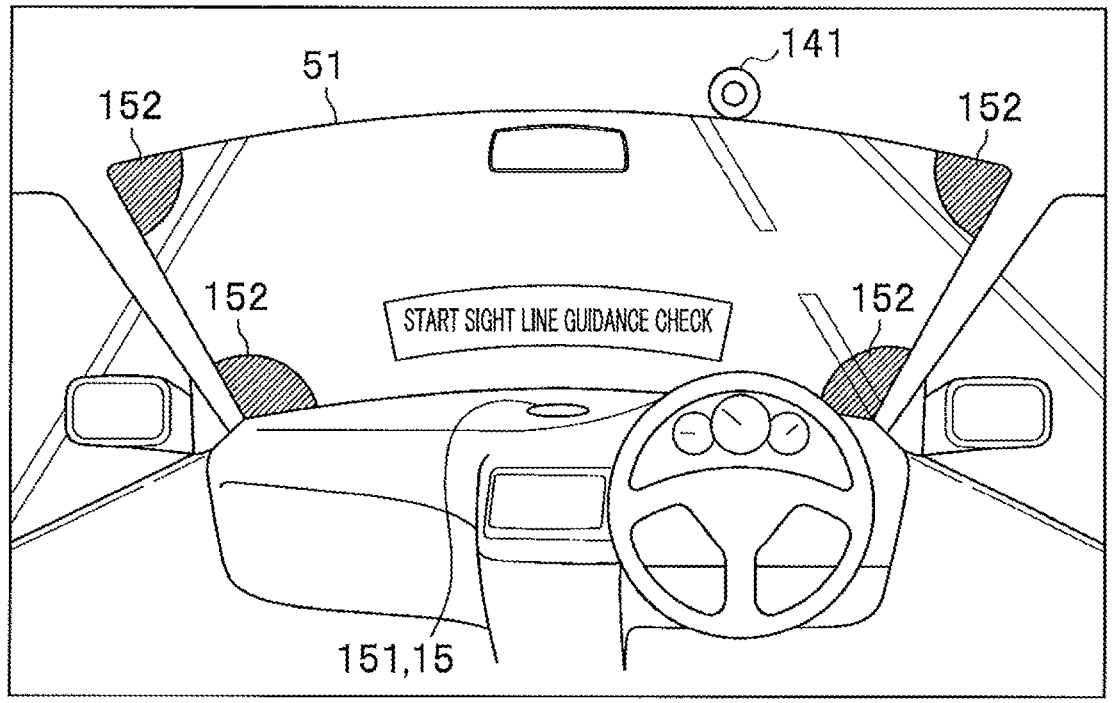
FIG. 5 is a diagram showing an example of a display screen to be displayed when the sight line guidance check process is started.

FIG. 4 is a diagram showing an example of a process flow of a sight line guidance check process to be performed by the sight line guidance checker 32. FIG. 5 is a diagram showing an example of a display screen to be displayed when the sight line guidance check process is started. FIGS. 6A to 6H are each a diagram showing an example of a display screen to be displayed while the sight line guidance check process is being performed. FIG. 7 is a diagram showing an example of a display screen to be displayed when the sight line guidance check process is terminated normally. Referring to FIGS. 4 to 7, descriptions will be hereinafter provided for the process flow of the sight line guidance check process.

Once starting the sight line guidance check process of FIG. 4, the sight line guidance checker 32, first of all, displays a message informing the driver of the start of the sight line guidance check process on the windshield glass 51 serving the screen of the HUD 151 (step S11). Incidentally, the message informing the driver of the start of the sight line guidance check process may be displayed on a lower central portion of the windshield glass 51 as shown in FIG. 5, because the lower central portion thereof does not hind the front landscape so much. In this case, the sight line guidance patterns 152 are displayed in all the four corners of the windshield glass 51, respectively. The above step enables the driver to realize the start of the sight line guidance check process, and to know the positions of the respective sight line guidance patterns 152.

Figure 6A:
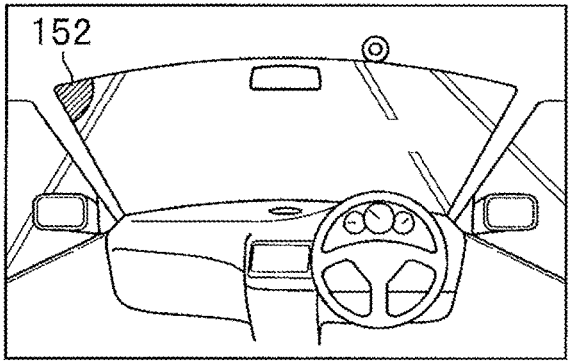
FIGS. 6A to 6H are each a diagram showing an example of a display screen to be displayed while the sight line guidance check process is performed.
Figure 7:
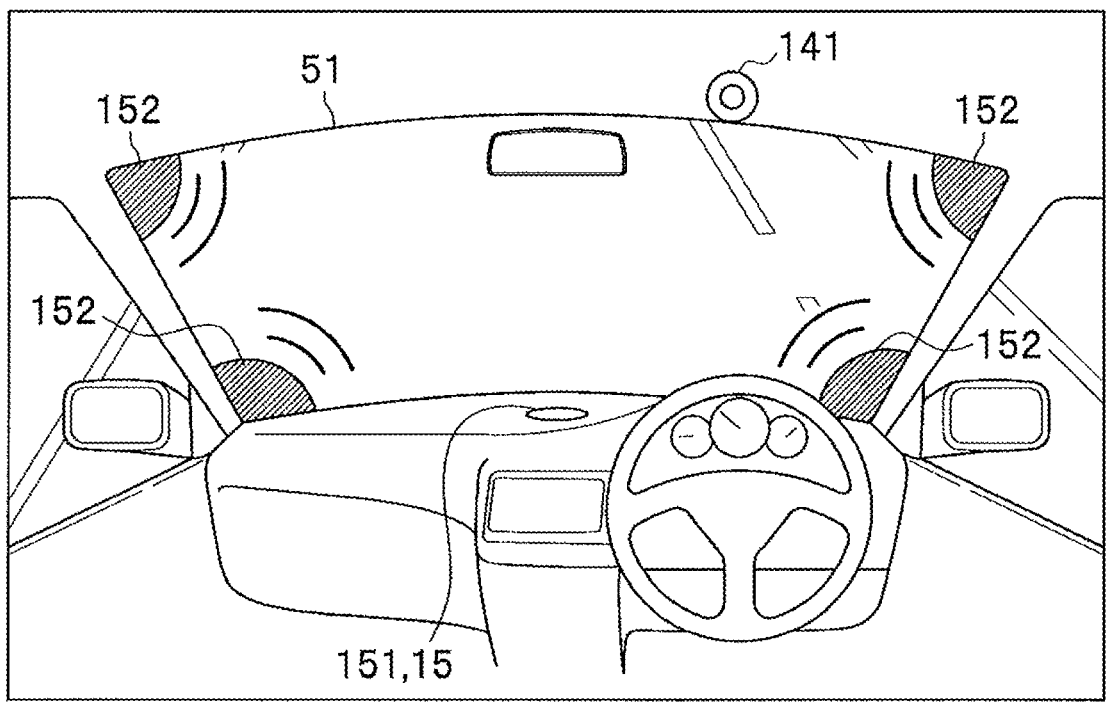
FIG. 7 is a diagram showing an example of a display screen to be displayed when the sight line guidance check process is normally terminated.

Next, as shown in FIG. 6A, the sight line guidance checker 32 flashing-displays the sight line guidance pattern 152 in the upper left corner of the windshield glass 51 for a predetermined time length (for example, for three seconds) (step S12). The sight line guidance checker 32 determines whether the driver's sight line acquired by the sight line detector 14 moves to the vicinity of the sight line guidance pattern 152 in the upper left corner during the flashing display of the sight line guidance pattern 152 in the upper left corner (step S13).

Figure 6B:
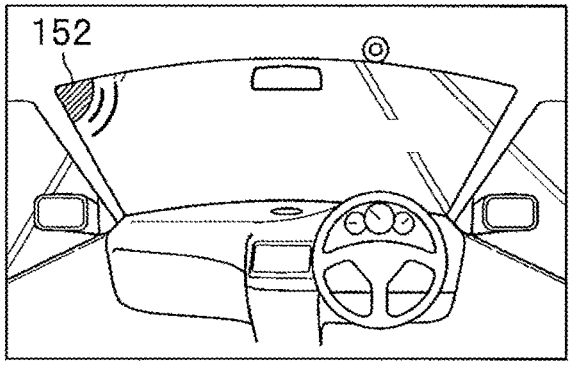

If the result of the determination in step S13 is that the driver's sight line has moved to the vicinity of the sight line guidance pattern 152 in the upper left corner (if Yes in step S13), the sight line guidance checker 32 flashing-displays the sight line guidance pattern 152 in the upper left corner, as shown in FIG. 6B (step S14). The flashing display indicates that the driver moves the sight line to the upper left corner normally (the sight line movement is OK). On the other hand, if the result of the determination in step S13 is that the driver's sight line has not moved to the vicinity of the sight line guidance pattern 152 in the upper left corner (if No in step S13), the execution of step S14 is skipped. In other words, the sight line guidance pattern 152 in the upper left corner is cancelled without being flashing-displayed.

Figure 6C:
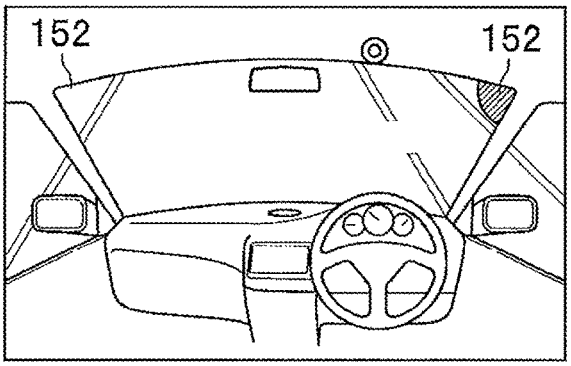

Next, as shown in FIG. 6C, the sight line guidance checker 32 flashing-displays the sight line guidance pattern 152 in the upper right corner of the windshield glass 51 for a predetermined time length (for example, for three seconds) (step S15). The sight line guidance checker 32 determines whether the driver's sight line acquired by the sight line detector 14 moves to the vicinity of the sight line guidance pattern 152 in the upper right corner during the flashing display of the sight line guidance pattern 152 in the upper right corner (step S16).

Figure 6D:
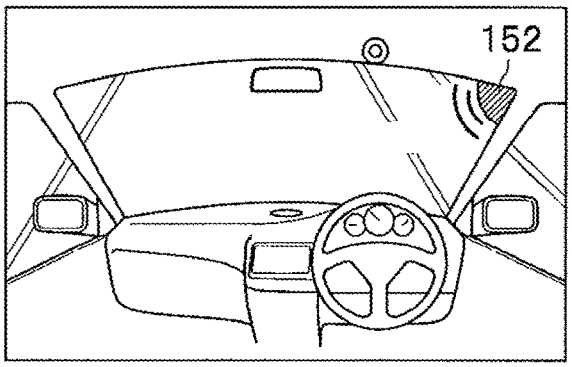

If the result of the determination in step S16 is that the driver's sight line has moved to the vicinity of the sight line guidance pattern 152 in the upper right corner (if Yes in step S16), the sight line guidance checker 32 flashing-displays the sight line guidance pattern 152 in the upper right corner, as shown in FIG. 6D (step S17). The flashing display indicates that the driver moves the sight line to the upper right corner normally (the sight line movement is OK). On the other hand, if the result of the determination in step S16 is that the driver's sight line has not moved to the vicinity of the sight line guidance pattern 152 in the upper right corner (if No in step S16), the execution of step S17 is skipped. In other words, the sight line guidance pattern 152 in the upper right corner is cancelled without being flashing-displayed.

Figure 6E:
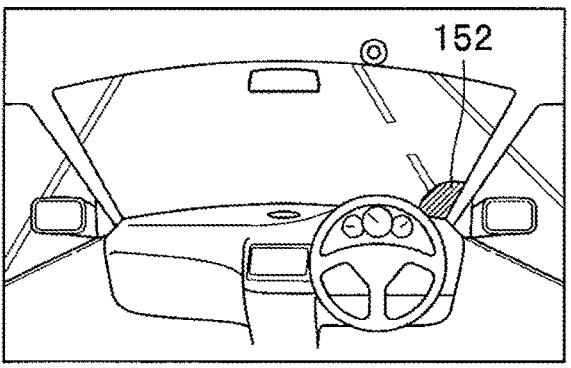

Next, as shown in FIG. 6E, the sight line guidance checker 32 flashing-displays the sight line guidance pattern 152 in the lower right corner of the windshield glass 51 for a predetermined time length (for example, for three seconds) (step S18). The sight line guidance checker 32 determines whether the driver's sight line acquired by the sight line detector 14 moves to the vicinity of the sight line guidance pattern 152 in the lower right corner during the flashing display of the sight line guidance pattern 152 in the lower right corner (step S19).

Figure 6F:
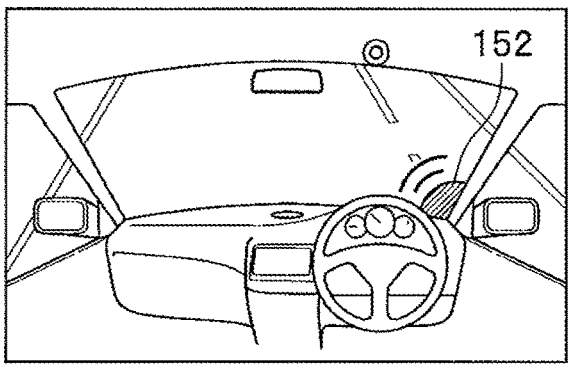

If the result of the determination in step S19 is that the driver's sight line has moved to the vicinity of the sight line guidance pattern 152 in the lower right corner (if Yes in step S19), the sight line guidance checker 32 flashing-displays the sight line guidance pattern 152 in the lower right corner, as shown in FIG. 6F (step S20). The flashing display indicates that the driver moves the sight line to the lower right corner normally (the sight line movement is OK). On the other hand, if the result of the determination in step S19 is that the driver's sight line has not moved to the vicinity of the sight line guidance pattern 152 in the lower right corner (if No in step S19), the execution of step S20 is skipped. In other words, the sight line guidance pattern 152 in the lower right corner is cancelled without being flashing-displayed.

Figure 6G:
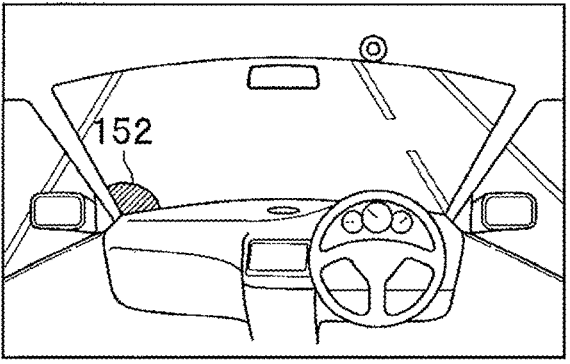

Next, as shown in FIG. 6G, the sight line guidance checker 32 flashing-displays the sight line guidance pattern 152 in the lower left corner of the windshield glass 51 for a predetermined time length (for example, for three seconds) (step S21). The sight line guidance checker 32 determines whether the driver's sight line acquired by the sight line detector 14 moves to the vicinity of the sight line guidance pattern 152 in the lower left corner during the flashing display of the sight line guidance pattern 152 in the lower left corner (step S22).

Figure 6H:
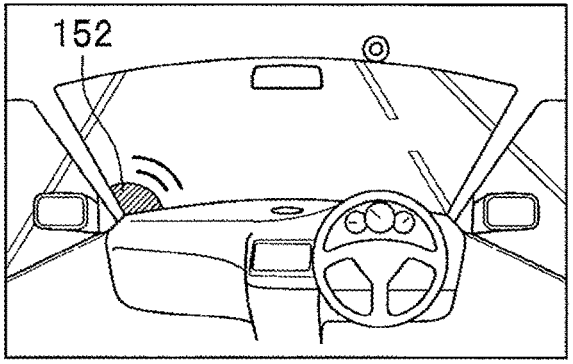

If the result of the determination in step S22 is that the driver's sight line has moved to the vicinity of the sight line guidance pattern 152 in the lower left corner (if Yes in step S22), the sight line guidance checker 32 flashing-displays the sight line guidance pattern 152 in the lower left corner, as shown in FIG. 6H (step S23). The flashing display indicates that the driver moves the sight line to the lower left corner normally (the sight line movement is OK). On the other hand, if the result of the determination in step S22 is that the driver's sight line has not moved to the vicinity of the sight line guidance pattern 152 in the lower left corner (if No in step S22), the execution of step S23 is skipped. In other words, the sight line guidance pattern 152 in the lower left corner is cancelled without being flashing-displayed.

Thereafter, the sight line guidance checker 32 determines whether the sight line has been normally guided to all the four corners of the windshield glass 51, that is to say, the upper left corner, upper right corner, lower right corner and lower left corner thereof (all the four corners are OK) (step S24). If the result of the determination is that the sight line has been normally guided to all the four corners (all the four corners are OK) (if Yes in step S24), the sight line guidance checker 32 flashing-displays all the sight line guidance patterns 152 respectively in the four corners, as shown in FIG. 7 (step S25). The respective flashing displays of the sight line guidance patterns 152 in the four corners indicate that the check of the guidance of the driver's sight line has been normally completed. The sight line guidance checker 32 terminates the sight line guidance check process of FIG. 4.

On the other hand, if the result of the determination in step S24 is that the sight line has not been normally guided to all the four corners (if No in step S24), the sight line guidance checker 32 counts the number of sight line guidance checks which the sight line guidance checker 32 has performed (step S26). In this respect, the number of sight line guidance checks means how many times the process from step S12 through step S23 has been carried out. Thereafter, the sight line guidance checker 32 determines whether the number of checks has reached a predetermined number (for example, three) (step S27). If the result of determination is that the number of checks has not reached the predetermined number (for example, three) (if No in step S27), the sight line guidance checker 32 returns to step S12, and carries out the sight line guidance check process from step S12 once again.

If the result of the determination in step S27 is that the number of checks has reached the predetermined number (for example, three) (if Yes in step S27), the sight line guidance checker 32 further counts the number of checks with sound (step S28). In this respect, the number of checks with sound means how many times the process from step S12 through step S23 has been carried out with sound. Moreover, the carrying out with sound means that in steps S12, S15, S18 and S21, the sight line guidance checker 32 outputs sound such as beep sound or chime sound while flashing-displaying the sight line guidance patterns 152. Incidentally, the sound output in these steps may be voices or the like, such as "upper left" and "upper right" which indicate the positions of the respectively flashing-displayed sight line guidance patterns 152.

Next, the sight line guidance checker 32 determines whether the number of checks with sound has reached a predetermined number (for example, three) (step S29). If the result of the determination is that the number of checks with sound has not reached the predetermined number (for example, three) (if No in step S29), the sight line guidance checker 32 displays a message informing the driver of the start of the sight line guidance check with sound on the windshield glass 51 (step S30). Thereafter, the sight line guidance checker 32 returns to step S12, and carries out the sight line guidance check process from step S12 once again. Incidentally, in step S30, the sight line guidance checker 32 may use sound to inform the user of the start of the sight line guidance check with sound.

If the result of the determination in step S29 is that the number of checks with sound has reached the predetermined number (for example, three) (if Yes in step S29), the sight line guidance checker 32 instructs the traveling controller 31 to perform a vehicle self-stopping process (step S31). Specifically, that the number of checks with sound has reached the predetermined number (for example, three) means, for example, that: the usual sight line guidance check has been carried out three times; the sight line guidance check with sound has been carried out three times; and all these sight line guidance checks have confirmed failure in the sight line guidance. This further means that the driver is not aware at all. As long as the driver is not aware, the driver cannot fulfill the responsibility for monitoring the automatic driving. The automatic traveling vehicle, therefore, stops its traveling.

It should be noted that in the process in step S31, the automatic driving level may be raised instead of stopping the traveling of the automatic traveling vehicle. For example, in a case where it is determined that the driver is not aware while the host vehicle is traveling at Level 2 which requires the driver to take the monitoring responsibility, the automatic traveling level may be raised to Level 3 which usually does not require the driver to take the monitoring responsibility if the condition of the road which the host vehicle is traveling allows the automatic traveling level to be thus raised.

As described above, the sight line guidance check process explained using FIG. 4 and the like is a process for checking whether the driver is aware enough to fulfill the responsibility for monitoring the automatic traveling. For this reason, in a case where it is predicted that the automatic driving level will be switched from Level 3 to Level 2, or from Level 2 to Level 1, this sight line guidance check process is performed before the switching. Furthermore, in a case where the automatic traveling is being carried out at Level 2, this sight line guidance check process is performed each time a predetermined time length (for example, 10 minutes) elapses. Alternatively, this sight line guidance check process is performed irregularly instead of at intervals of a fixed time length. Otherwise, the this sight line guidance check process may be performed in a case where it is predicted that the host vehicle will approach an intersection where large roads meet and cross each other, an intersection where the host vehicle needs to make a right or left turn, a railroad crossing, or the like.

In the embodiment, for example, even in a case where the host vehicle enters a general road from a highway and the automatic driving level is automatically switched from Level 3 to Level 2, the timing of the switch can be known based on the information about the path to the destination acquired by the navigation system 13. Similarly, even in a case where the host vehicle enters a congested urban area and the automatic driving level is automatically switched from Level 2 to Level 1, the timing of the switch can be known. For these reasons, the embodiment is capable of checking whether the driver is aware at appropriate timings. If as the result of the check, it is determined that the driver can fulfill no responsibility for monitoring the automatic driving, the automatic traveling vehicle stops its driving. Accordingly, the embodiment makes it possible to enhance the reliability of the automatic driving of the automatic traveling vehicle.

Moreover, in the embodiment, the sight line guidance patterns 152 are sequentially flashing-displayed respectively in the four corners of the windshield glass 51, and the movement of the driver's sight line is checked by chasing the flashing-displayed sight line guidance patterns 152. The movement of the driver's sight line like this is a very natural movement of the sight line which is often performed while the driver is monitoring the automatic driving of the host vehicle or driving the host vehicle in actual scenes. In other words, the movement of the driver's sight line in the embodiment corresponds to the driver's action of looking at a left far area (the vicinity of the left corner) and a right far area (the vicinity of the right corner) as well as checking an area right adjacent to the vehicle body (the lower right vicinity) and an area left adjacent to the vehicle body (the lower left vicinity). Accordingly, the embodiment makes it possible to know whether the drive is aware with almost no overload on the driver.

In addition, since the check on the guidance of the driver's sight line ensures the driver's action of looking at the left far area and the right far area as well as checking the right and left vicinities of the vehicle body, it is possible to regard the driver who passes this check as being able to sufficiently fulfill the responsibility for monitoring the automatic driving. In other words, the embodiment makes it possible to determine whether the driver is aware enough to fulfill the responsibility for monitoring the automatic driving of the automatic traveling vehicle. Besides, through the above-described sight line guidance checks, the embodiment is capable of achieving an interaction system between the driver and the vehicle which makes it possible to check whether the driver is checking the front with almost no stress put on the driver.

Although the foregoing embodiment of the present invention displays the sight line guidance patterns 152 for the respective sight line guidance checks in the four corners of the windshield glass 51, the sight line guidance patterns 152 may be displayed on the rear window glass or a side window glass. Since the automatic driving at Level 3 or a higher level does not require the driver to take the monitoring responsibility, the driver does not necessarily looks at the front. For this reason, if the sight line guidance patterns 152 can be displayed on the rear window glass or a side window glass, the guidance of the driver's sight line can be checked without necessarily requiring the driver to look at the front. In this case, however, the driver monitor camera 141 for detecting the sight line needs to be installed above the rear window glass or the side window glass.

Furthermore, although the foregoing embodiment of the present invention displays the sight line guidance patterns 152 by the projection of the sight line guidance patterns 152 from the HUD 151, the sight line guidance patterns 152 may be displayed by transparent light-emitting members made of liquid crystal or the like, light-emitting diodes, or similar things, which are stuck to the four corners of the windshield glass 51. A higher energy saving effect and a higher cost reduction effect can be expected from the use of the transparent light-emitting members, the light-emitting diodes or the like than from the use of the HUD 151.

Moreover, although the foregoing embodiment of the present invention displays the sight line guidance patterns 152 in the four corners of the windshield glass 51 in order from the upper left corner, followed by the upper right corner, followed by the lower right corner and followed by the lower left corner so that the driver's sight line chases the display of the sight line guidance patterns 152, the order of the display is not limited to this. For example, it is preferable that the order of the display be set such that the movement of the driver's sight line is as long as possible, for example, such that the upper left corner is followed by the lower right corner, followed by the lower left corner, and followed by the upper right corner. It may be considered that the longer movement of the driver's sight line increases the effect of making the driver aware. Otherwise, the order of the display may be changed randomly each time the sight line guidance check is performed. It may be considered that the effect of making the driver aware is larger in the case where the driver can predict no direction of the sight line movement.

Although embodiments of the present invention have been described and illustrated in detail, the disclosed embodiments are made for purposes of illustration and example only and not limitation. The scope of the present invention should be interpreted by terms of the appended claims.

What is claimed is:

1. Transportation equipment comprising:
   a controller configured to perform at least steering, acceleration and deceleration to control traveling of the transportation equipment;
   a sight line detector for detecting a sight line of an occupant of the transportation equipment; and
   a display configured to display a sight line guidance pattern, the sight line guidance pattern used to guide the sight line of the occupant to one of possible positions, each of the possible positions in a different direction of the sight line of the occupant, wherein the controller is configured to
perform a sight line guidance check while the transportation equipment is traveling, and
in response to the occupant failing the sight line guidance check, bring the transportation equipment to a stop, and wherein in performing the sight line guidance check, the controller is configured to
cause the display to display the sight line guidance pattern while the transportation equipment is traveling,
determine, in response to the sight line guidance pattern being displayed, whether the detected sight line of the occupant moves to a vicinity of one of the possible positions at which the sight line guidance pattern is displayed, and
decide whether the occupant has failed the sight line guidance check in response to a result of the determination.

2. The transportation equipment according to claim 1, wherein
the controller is configured to perform the sight light guidance check in response to a change in degrees of control to the transportation equipment by the occupant and the controller are predicted in controlling the traveling of the transportation equipment.

3. The transportation equipment according to claim 2, wherein
the display is configured to display the sight line guidance pattern on a window located forward in a traveling direction of the transportation equipment.

4. The transportation equipment according to claim 3, wherein
the controller is configured to determine an order of positions where the sight line guidance pattern is sequentially displayed based on an order of lengths by which the sight line of the occupant is to move.

5. The transportation equipment according to claim 2, wherein
the display is configured to display the sight line guidance pattern on a window located rearward in a traveling direction or at a lateral side of the transportation equipment.

6. The transportation equipment according to claim 5, wherein
the controller is configured to determine an order of positions where the sight line guidance pattern is sequentially displayed based on an order of lengths by which the sight line of the occupant is to move.

7. The transportation equipment according to claim 2, wherein
the controller is configured to determine an order of positions where the sight line guidance pattern is sequentially displayed based on an order of lengths by which the sight line of the occupant is to move.

8. The transportation equipment according to claim 1, wherein
the display is configured to display the sight line guidance pattern on a window located forward in a traveling direction of the transportation equipment.

9. The transportation equipment according to claim 8, wherein
the controller is configured to determine an order of positions where the sight line guidance pattern is sequentially displayed based on an order of lengths by which the sight line of the occupant is to move.

10. The transportation equipment according to claim 1, wherein
the display is configured to display the sight line guidance pattern on a window located rearward in a traveling direction or at a lateral side of the transportation equipment.

11. The transportation equipment according to claim 10, wherein
the controller is configured to determine an order of positions where the sight line guidance pattern is sequentially displayed based on an order of lengths by which the sight line of the occupant is to move.

12. The transportation equipment according to claim 1, wherein
the controller is configured to determine an order of positions where the sight line guidance pattern is sequentially displayed based on an order of lengths by which the sight line of the occupant is to move.

13. The transportation equipment according to claim 1, wherein
the controller is configured to determine a random order of positions where the sight line guidance pattern is sequentially displayed.

14. A traveling control method for transportation equipment including:
a controller configured to perform at least steering, acceleration and deceleration to control traveling of the transportation equipment;
a sight line detector for detecting a sight line of an occupant of the transportation equipment; and
a display configured to display a sight line guidance pattern, the sight line guidance pattern used to guide the sight line of the occupant to one of possible positions, each of the possible positions in a different direction of the sight line of the occupant,
the traveling control method comprising:
performing a sight line guidance check by means of the controller while the transportation equipment is traveling; and
in response to the occupant failing the sight line guidance check, bringing the transportation equipment to a stop,
wherein the performing the sight line guidance check comprises:
causing the display to display the sight line guidance pattern by means of the controller;
determining, in response to the sight guidance pattern being displayed, whether the detected sight line of the occupant moves to a vicinity of one of the possible positions at which the sight line guidance pattern is displayed, by means of the controller; and
deciding, in response to a result of the determination, whether the occupant has failed the sight line guidance check by means of the controller.

15. The traveling control method for the transportation equipment, according to claim 14, wherein the method includes:
performing the sight line guidance check by means of the controller in response to a change in degrees of control to the transportation equipment by the occupant and the controller are predicted in controlling the traveling of the transportation equipment.

16. The traveling control method for the transportation equipment, according to claim 15, wherein the performing the sight line guidance check further includes determining, by means of the controller, an order of positions where the sight line guidance pattern is sequentially displayed based on an order of lengths by which the sight line of the occupant is to move.

17. The traveling control method for the transportation equipment, according to claim 14, wherein the performing the sight line guidance check further includes determining, by means of the controller, an order of positions where the sight line guidance pattern is sequentially displayed based on an order of lengths by which the sight line of the occupant is to move.

18. Transportation equipment comprising:

a controller configured to perform at least steering, acceleration and deceleration to control traveling of the transportation equipment;

a sight line detector for detecting a sight line of an occupant of the transportation equipment; and a display configured to display a sight line guidance pattern, the sight line guidance pattern used to guide the sight line of the occupant to one of possible positions, each of the possible positions in a different direction of the sight line of the occupant, wherein the controller is configured to cause the display to display the sight line guidance pattern at two or more of the possible positions in sequence while the transportation equipment is traveling, determine, in response to the sight line guidance pattern being displayed, whether the detected sight line of the occupant moves to a vicinity of each position at which the sight line guidance pattern is displayed, decide whether a sight line guidance has failed in response to a result of the determination, and perform a safety measure in response to deciding that the sight line guidance has failed.

19. The transportation equipment according to claim 18, wherein the safety measure includes bringing the transportation equipment to a stop.

20. The transportation equipment according to claim 18, wherein the safety measure includes bringing the transportation equipment to a stop or raising a level of automatic travelling.

* * * * *